US010313091B2

United States Patent
Chini et al.

(10) Patent No.: US 10,313,091 B2
(45) Date of Patent: Jun. 4, 2019

(54) ROBUST ELECTROMAGNETIC COMPATIBILITY PERFORMANCE FOR IN-VEHICLE ETHERNET PHYS UTILIZING TIME DIVISION DUPLEXING

(71) Applicant: Avago Technologies International Sales Pte. Limited, Singapore (SG)

(72) Inventors: Ahmad Chini, Mission Viejo, CA (US); Mehmet V. Tazebay, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 200 days.

(21) Appl. No.: 15/135,302

(22) Filed: Apr. 21, 2016

(65) Prior Publication Data

US 2017/0134149 A1      May 11, 2017

Related U.S. Application Data

(60) Provisional application No. 62/252,182, filed on Nov. 6, 2015.

(51) Int. Cl.
| | |
|---|---|
| *H04L 5/14* | (2006.01) |
| *H04B 1/3822* | (2015.01) |
| *H04L 12/835* | (2013.01) |
| *H04L 12/403* | (2006.01) |
| *H04L 12/40* | (2006.01) |

(52) U.S. Cl.
CPC ............. *H04L 5/14* (2013.01); *H04B 1/3822* (2013.01); *H04L 12/4035* (2013.01); *H04L 47/30* (2013.01); *H04L 2012/40273* (2013.01)

(58) Field of Classification Search
CPC ....... H04L 5/14; H04L 12/4035; H04L 47/30; H04B 1/3822
See application file for complete search history.

(56) References Cited

U.S. PATENT DOCUMENTS

| | | | |
|---|---|---|---|
| 2003/0151530 A1* | 8/2003 | Shi ........................ | H03M 9/00 341/100 |
| 2005/0134306 A1* | 6/2005 | Stojanovic ............ | H04L 25/028 326/31 |
| 2006/0092967 A1 | 5/2006 | Bergeron et al. | |

(Continued)

FOREIGN PATENT DOCUMENTS

EP    2 568 652 A1    3/2013

OTHER PUBLICATIONS

European Search Report directed to related European application No. 16002333.9, dated Mar. 7, 2017; 4 pages.

*Primary Examiner* — Siming Liu
(74) *Attorney, Agent, or Firm* — Sterne, Kessler, Goldstein & Fox P.L.L.C.

(57) ABSTRACT

Currently, there exists low power Ethernet PHY solutions running at 10 Gbps over twin-ax cables with SFP+ connectors. However, the cost and range of these cables, along with the size of the connectors, do not match the requirements of in-vehicle networks. If the cable is replaced with a single pair of shielded or coaxial cables, a different mechanism is needed to provide bi-directional communication. Time division duplexing (TDD) can be used to emulate full duplex communication over the single pair of cables by taking turns, in time, transmitting data over the pair of cables in each direction.

25 Claims, 5 Drawing Sheets

(56) References Cited

U.S. PATENT DOCUMENTS

| | | | |
|---|---|---|---|
| 2008/0069144 A1* | 3/2008 | Yu | H04L 25/4923 |
| | | | 370/476 |
| 2008/0102763 A1* | 5/2008 | Yoon | H04B 1/525 |
| | | | 455/78 |
| 2012/0287829 A1* | 11/2012 | Chang | H04L 5/16 |
| | | | 370/296 |
| 2013/0058265 A1* | 3/2013 | Chini | H04L 5/1469 |
| | | | 370/294 |
| 2014/0010537 A1 | 1/2014 | Boyd | |
| 2016/0267722 A1* | 9/2016 | Schroeder | G07C 5/008 |

* cited by examiner

ROBUST ELECTROMAGNETIC COMPATIBILITY PERFORMANCE FOR IN-VEHICLE ETHERNET PHYS UTILIZING TIME DIVISION DUPLEXING

CROSS REFERENCE TO RELATED APPLICATIONS

This application claims the benefit of U.S. Provisional Application No. 62/252,182, filed Nov. 6, 2015, which is incorporated herein by reference in its entirety.

TECHNICAL FIELD

This application relates generally to in-vehicle networks, including Ethernet based in-vehicle networks.

BACKGROUND

The electronics in an automobile are typically divided into different domains, such as the power train domain, the chassis domain, the body/comfort domain, the driver assistance domain, and the human-machine interface (HMI) domain. Traditionally, each of these domains contained a set of control units and sensors that operated independently from the control units and sensors of the other domains. Today, there is a lot more interaction between the domains in support of new, advanced features, such as lane-departure warning and collision avoidance. On top of the increased inter-domain interaction, these new, advanced features have further led to an increase in the number of control units and sensors within each domain and the sophistication of these units in terms of the amount of data they process and the speed at which they operate.

The in-vehicle network infrastructure, used to support communications within and between these domains, has suffered as a result of the increased electronic complexity. The amount of cabling alone used by conventional in-vehicle network infrastructures has caused the car cable assembly to become not only one of the highest cost components in the car (often behind only the engine and chassis), but also one of the heaviest, which negatively effects fuel economy. Also, to support different latency and bandwidth requirements of the various control systems and sensors, the conventional in-vehicle network infrastructure has evolved into a heterogeneous network of various communications networks and protocols, such as the Local Interconnect Network (LIN), flex Ray Controller Area Network (CAN), Low-Voltage Differential Signaling (LVDS), and the Media Oriented Systems Transport (MOST) protocol. This network heterogeneity complicates communications between domains by requiring gateways to effectuate such exchanges.

To provide further context, FIG. 1 illustrates an example overview of a conventional in-vehicle network 100. As shown in FIG. 1, conventional in-vehicle network 100 is divided among several different domains, including a power train domain, an HMI domain, a body/comfort domain, a chassis domain, and a driver assistance domain. The power train domain includes electronic controllers and sensors that are active in the forward and backward movement of the vehicle, including electronic controllers and sensors associated with the operation of the engine, transmission, and shafts. The chassis domain includes electronic controllers and sensors that relate to the framework of the automobile and the movement/position of the wheels. For example, the chassis domain can include electronic controllers and sensors that support steering, braking, and suspension. The body/comfort domain includes electronic controllers and sensors for such things as door locks, climate control, and seat control. The HMI domain includes electronics that provide for information exchange between the automobile's electronics and the driver/passengers. For example, the HMI domain includes video systems, phone systems, and infotainment systems. Finally, the driver assistance domain includes electronic controllers and sensors that aid the driver in driving the automobile. The electronic controllers and sensors in the driver assistance domain relate to such systems as cruise control, lane departure warning, and collision avoidance.

As mentioned above, because of the different requirements of each domain, such as latency and bandwidth requirements, the domains often use different communication protocols. For example, as shown in FIG. 1, the power train domain uses a CAN based network 102, the HMI domain uses a LVDS/MOST based network 104, the body/comfort domain uses a LIN based network 106, and the chassis domain uses a FlexRay based network 108. This network heterogeneity requires each domain to have a separate gateway 110-118, as further shown in FIG. 1, to allow for communications between the domains over a backbone network.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Figure 1:
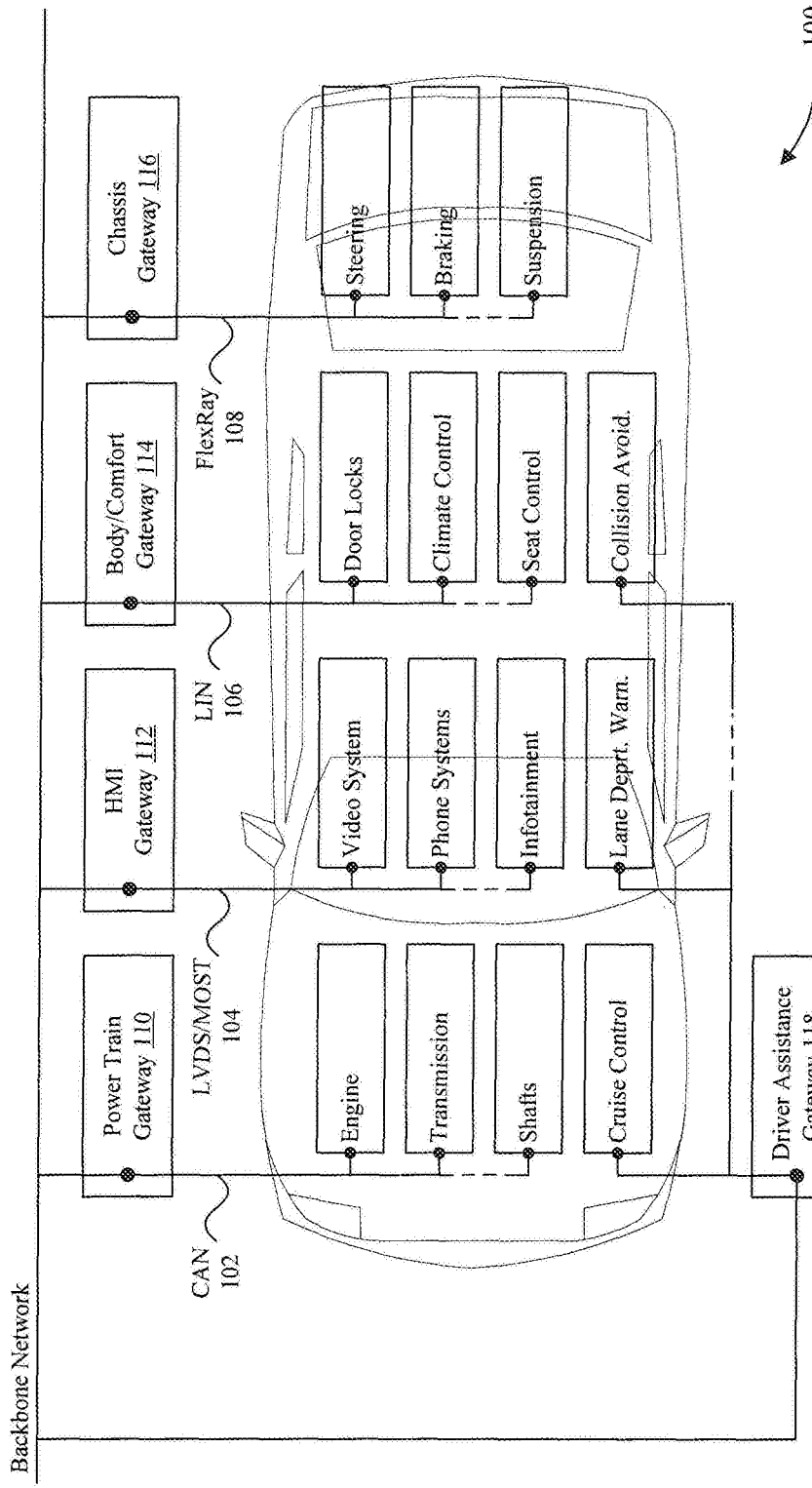
FIG. 1 illustrates an example of a conventional in-vehicle network.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. ETHERNET BASED IN-VEHICLE NETWORK

Because of the issues with conventional in-vehicle networks discussed above, a new approach to in-vehicle networks that reduces cost, complexity, and/or weight is desired. A homogenous, switched Ethernet based in-vehicle network could be used to this end But conventional switched Ethernet networks are generally costly for automotive applications and do not meet automotive electromagnetic interference (EMI) requirements while the ear is moving. For example, at the data speeds of common Ethernet PHYs, such as 100BASE-TX PHYs and 1000BASE-TX PHYs, the signal edges produced by these devices are fast enough to result in too much radiated energy to meet automotive EMI requirements. Shielded cables can be used to reduce EMI, but at increased cost and weight.

Certain embodiments of the present disclosure may be found in a local PHY in an automobile that converts standard Ethernet media independent interface (MII) data from a 4-bit packet stream, for example, to a 3-bit packet stream (where 4-bits and 3-bits are only exemplary values and can be different values as would be appreciated by one of ordinary skill in the art based on the teachings herein). The 3-bit packet stream may be mapped to first and second ternary bits streams for communication to a remote PHY in the automobile utilizing PAM-3 over an unshielded twisted-pair cable. The local PHY can multiplex the ternary bits streams into a single stream for transmission over the unshielded twisted-pair cable. In other words, the data flow of the Ethernet line code may begin from a 4-bit MII data stream and then undergo reformation into a 3-bit binary data stream (4b3b) and further converted to two ternary bit (3b2t) streams.

The two ternary bit streams may represent nine possible values where only eight values may be needed to represent the 3-bit binary data. In this regard, the extra ninth value in the ternary bits representation may be utilized in start and/or end of stream control codes and may also be utilized to indicate transmit error. The ninth value h the ternary bit representation may also be utilized to resolve the ordering of the ternary symbol stream over a single twisted-pair wire connection.

For automotive applications, the above described Ethernet line code can allow the line rate to be slowed down in order to reduce EMI so that cheaper and lighter weight unshielded cabling can be used while still meeting automotive EMI requirements.

Figure 2:
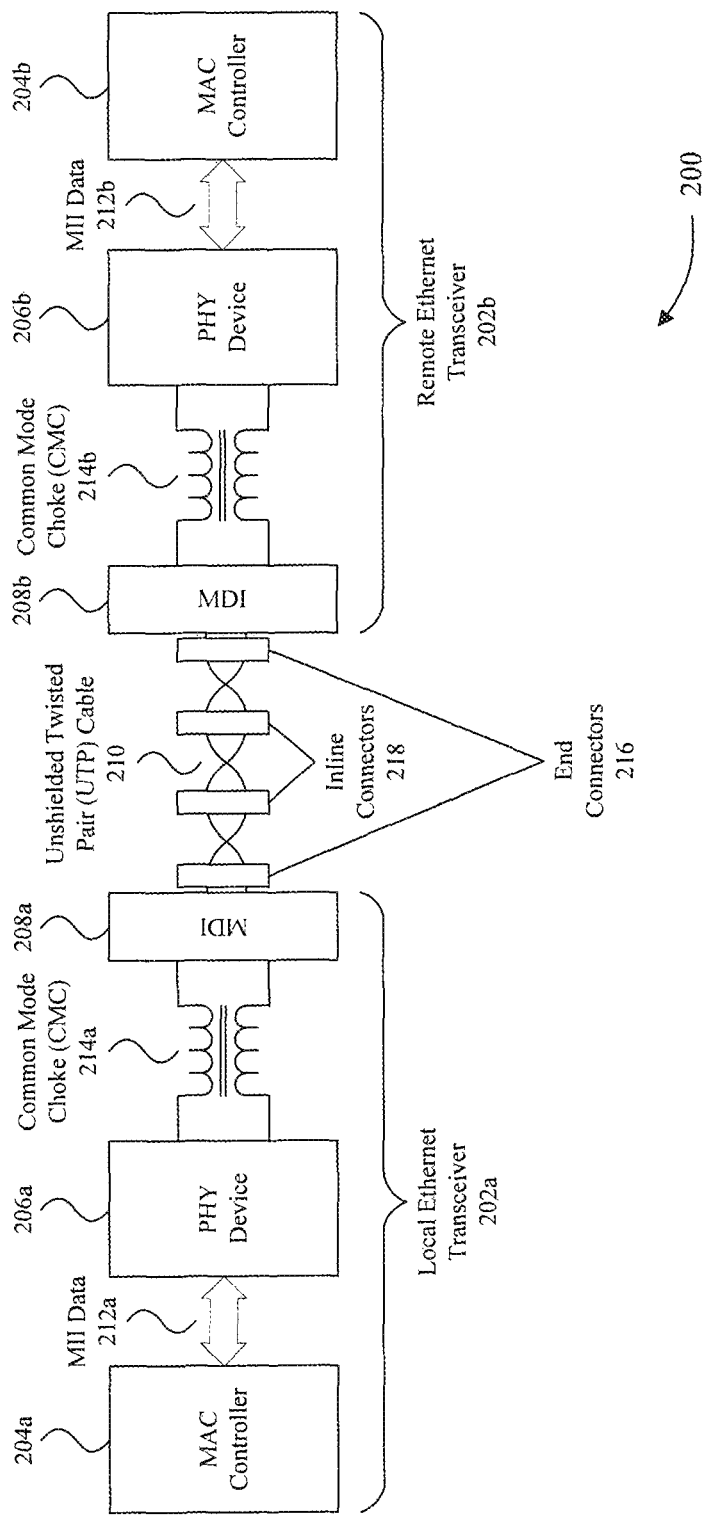
FIG. 2 illustrates an example block diagram of an Ethernet over unshielded twisted-pair (UTP) cabling link between a local Ethernet transceiver and a remote Ethernet transceiver in accordance with embodiments of the present disclosure.

FIG. 2 illustrates an example block diagram of an Ethernet over unshielded twisted-pair (UTP) cabling link 200 between a local Ethernet transceiver 202a and a remote Ethernet transceiver 202b in accordance with embodiments of the present disclosure. The two transceivers can be implemented within an automobile. The local Ethernet transceiver 202a comprises a medium access control (MAC) controller 204a, a physical layer (PHY) device 206a, and a medium dependent interface (MDI) 208a. The remote Ethernet transceiver 202b similarly comprises a MAC controller 204b, a PHY device 206b, and a MDI 208b.

The local Ethernet transceiver 202a and the remote Ethernet transceiver 202b communicate via a UTP cable 210. The UTP cable 210 comprises a single pair of unshielded copper wires, for example. Certain performance criteria for UTP copper cabling have been standardized. For example, Category 3 cabling may provide the necessary performance for 10 Mbps Ethernet transmissions over twisted-pair cabling (10BASE-T). In another example. Category 5 cabling may provide the necessary performance for 1000 Mbps Ethernet transmissions over twisted-pair cabling (1000BASE-T).

The data transmitted and received by the transceivers 202a and 202b can be formatted in accordance with the well-known Open Systems Interconnection (OSI) model. The OSI model partitions operability and functionality into seven distinct and hierarchical layers. Generally, each layer in the OSI model is structured so that it may provide a service to the immediately higher interfacing layer. For example, layer 1, or the PITY layer, can provide services to layer 2, or the data link layer, and layer 2 can provide services to layer 3, or the network layer. The data transmitted can comprise frames of Ethernet media independent interface (MII) data 212a and 212b, which can be delimited by start-of-stream and end-of-stream delimiters, for example. The data transmitted can also comprise IDLE codes that can be communicated between frames of data.

In the example Ethernet system shown in FIG. 2, the MAC controllers 204a and 204b represent layer 2 devices and the PHY devices 206a and 206b represent layer 1 devices. Devices not shown in FIG. 2, but coupled to MAC controllers 204a and 204b, represent one or more of the five highest layers. During transmission, each layer can add its own header to the data passed on from the interfacing layer above it. During reception, a compatible device having a similar OSI stack as the transmitting device can strip off the headers as the message or packet passes from the lower layers up to the higher layers.

The MAC controllers 204a and 204b comprise suitable logic, circuitry, and/or code configured to provide the layer 2 requirements. The MAC controllers 204a and 204b can be configured as standard Ethernet MACs, such as those based on the IEEE 802.3 standard (e.g., the 100BASE-T IEEE 802.3 standard or the 1000BASE-T IEEE 802.3 standard).

The PHY devices 206a and 206b comprise suitable logic, circuitry, and/or code configured to provide layer 1 requirements, which include, but are not limited to, packetization, data transfer, and serialization/deserialization. Data packets respectively received by the PHY devices 206a and 206b from MAC controllers 204a and 204b can include data and header information for each of the above six functional layers of the OSI model. The PHY devices 206a and 206b can be configured to encode data packets that are to be transmitted over the UTP cable 210 and/or to decode data packets received from the UTP cable 210.

Unlike the MAC controllers 204a and 204b, the PHY devices 206a and 206b may not be configured as standard Ethernet PHY devices based on the IEEE 802.3 standard. The changes to the PHY devices 206a and 206b may be made in order to meet cost, weight, and EMI demands of automotive in-vehicle networks. For example, where MAC controllers 204a and 204b are configured as standard 100Base-T Ethernet MACs or 1000Base-T Ethernet MACs, PHY devices 206a and 206b can be configured to respectively convert Ethernet MII data 212a and 212b, respectively produced by MAC controllers 204a and 204b, from 4-bit packet streams to 3-bit packet streams. The 3-bit packet streams can each be mapped to first and second ternary bits streams for communication to the other PHY device utilizing PAM-3 over the unshielded twisted-pair cable 210. The transmitting PHY device can multiplex the ternary bits streams into a single stream for transmission over the unshielded twisted-pair cable 210. For automotive applications, this Ethernet line code provided by the PHY devices 206a and 206b can allow the line rate to be slowed down as compared to standard PHY devices compliant with the IEEE 802.3 standard in order to reduce EMI so that cheaper, lightweight unshielded cabling, such as UTP cable 210, can be used while still meeting automotive EMI requirements. In addition, unlike standard Ethernet compliant PHYs, the PHY devices 206a and 206b can transmit and receive data over a single pair of cables instead of two or four pairs of cables used by 100BASE-T and 1000-BASE-T Ethernet transceivers.

It should be noted that common mode chokes (CMCs) 214a and 214b can be used to suppress common-mode noise and that UTP cable 210 can have, in addition to two end connectors 216, two or more inline connectors 218. It should be further noted that FIG. 2 provides only one example environment in which embodiments of the present disclosure can be implemented and is not meant to be limiting. The Ethernet system shown in FIG. 2 can be used, for example, to support communications within and between the different electronic domains in an automobile as shown in FIG. 1.

2. IN-VEHICLE ETHERNET PHY WITH ROBUST EMC PERFORMANCE USING TIME DIVISION DUPLEXING

Single-pair 100 megabit per second (Mbps) and 1 gigabit per second (Gbps) solutions for in-vehicle networks as described above are possible. However, in some instances, data rates above 1 Gbps may be required for in-vehicle networks. In such instances, shielded or coaxial cables may be used to meet automotive EMI requirements at these high data rates above 1 Gbps. However, the use of a single pair of cables is still beneficial to keeps costs and weight low.

Currently, there exists low power Ethernet PHY solutions running at 10 Gbps over twin-ax cables with SFP+ connectors. However, the cost and range of these cables, along with the size of the connectors, do not match the requirements of in-vehicle networks. Twin-ax cables provide full duplex operation using two separate pairs of coaxial cables (one pair for each direction of communication). If the cable is replaced with a single pair of shielded or coaxial cables, a different mechanism is needed to provide bi-directional communication. Time division duplexing (TDD) can be used to emulate full duplex communication over the single pair of cables by taking turns, in time transmitting data over the pair of cables in each direction. For example, to provide rates above 1 Gbps over a single pair of shielded or coaxial cables. TDD can be used along with standard 10 Gbps Ethernet technology.

Figure 3:
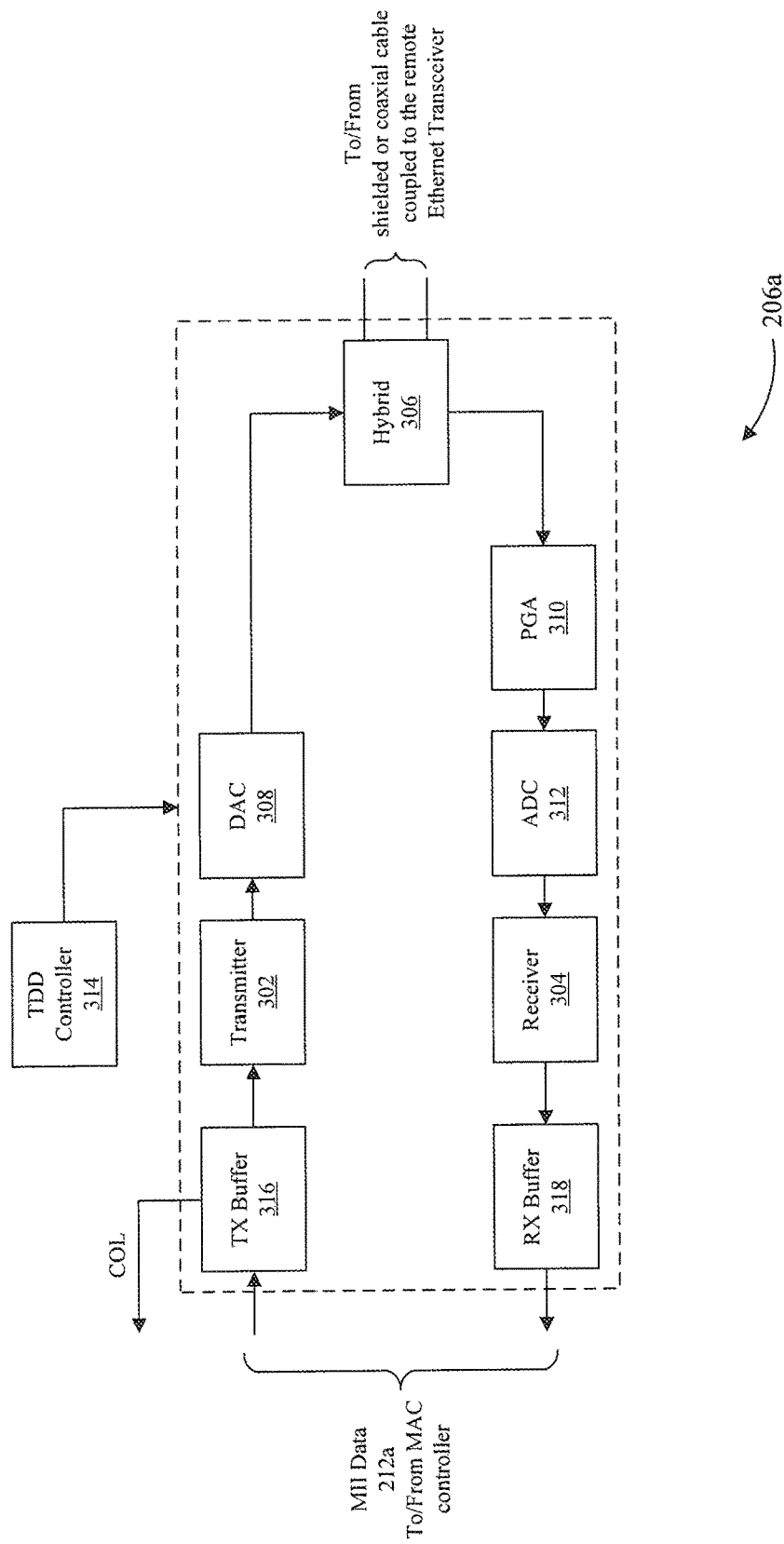
FIG. 3 illustrates an example block diagram of a PHY device that uses time division duplexing (TDD) to transmit and receive data over a single pair of shielded or coaxial cable coupled to a remote Ethernet transceiver in accordance with embodiments of the present disclosure.

Referring now to FIG. 3, an example block diagram of the PHY device 206a in FIG. 2 is illustrated in accordance with embodiments of the present disclosure. It should be noted that the implementation of the PHY device 206a in FIG. 3 is not limited to use within the Ethernet system in FIG. 2 and can be used in any appropriate Ethernet system as would be appreciated by one of ordinary skill in the art. The PHY device 206a uses TDD to transmit and receive data over a single pair of shielded or coaxial cables coupled to a remote Ethernet transceiver and can be used, for example, to support communications within and between the different electronic domains in an automobile as shown in FIG. 1.

The PHY device 206a includes a transmitter 302 that receives MII data 212a from the MAC controller 204a in FIG. 2, and a receiver 304 that transmits MIT data 212a to the MAC controller 204a. At the other ends of the transmitter 302 and the receiver 304, the transmitter 302 is coupled to a hybrid 306 through a digital-to-analog converter (DAC) 308 and the receiver 304 is coupled to the hybrid 306 through a programmable gain amplifier (PGA) 310 and an analog-to-digital converter (ADC) 312. The hybrid 306 enables signals transmitted and received over the UTP cable 210 by the PHY device 206a to be separated to allow for full-duplex communication (i.e., simultaneous communications in both directions over the UTP cable 210). The PHY device 206a further includes a TDD controller 314, a TX buffer 316, and a RX buffer 318. Also, because TDD is used, no echo canceller is implemented (or needed) by PHY device 206a.

The TX buffer 316 is used to allow for temporary storage of MII data 212a received from a MAC controller (not shown) while the PHY device 206a is receiving data over the shielded or coaxial cable. The MAC controller can be, for example, a standard IEEE 802.3 10 Gbps MAC controller. The MII data 212a stored in the TX buffer 316 is to be transmitted over the shielded or coaxial cable coupled to the remote Ethernet transceiver. The RX buffer 318 provides elasticity in matching clocks between the clock used by the PHY device 206a to receive data over the shielded or coaxial cable and the clock used by the MAC controller (again, not shown) to receive the MII data 212a stored in the RX buffer 318.

If the TX buffer 316 is filled and the shielded or coaxial cable is not available to transmit, data may be lost. The probability of packet loss is reduced using a large TX buffer 316 and reducing the effective data flow from the MAC to the PHY device 206a. The system throughput, latency, and buffer size are better utilized if a flow control mechanism exists between the MAC and the PHY device 206a. A control signal shown in FIG. 3 as being generated by the TX buffer 316 is for this purpose. Before the TX buffer 316 is filled and data is lost, the control signal (COL) is generated by the TX buffer 316 to signal to the MAC to pause its MII data 212a transmission to the PHY device 206a. Typically, in such cases, data is buffered in the switch buffers of the MAC and sent to the PHY device when the PHY device is available. Instead of generating the COL signal, the PHY device 206a may generate a PAUSE command as per the IEEE 802.3 standard to provide for flow control. In applications where the MAC is directly connected to the PHY device 206a and there is no switch buffer available at the MAC, the TX buffer 316 can be sized large enough to avoid packet loss.

The TDD controller 314 is configured to control the transmit and receive time of the components of the PHY device 206a within the dashed box. For example, the TDD controller 314 can provide a control signal to the components of the PHY device 206a within the dashed box that indicates when the PHY device 206a is to transmit. The receiver 304 can use this control signal provided by the TDD controller 314 to prevent adapting, any filter it may use during times when the PHY device 206a is transmitting. For example, any filters used by the receiver 304 to perform equalization or crosstalk cancellation can be halted from updating or adapting during times when the PHY device 206a is transmitting. The transmitter 302 can use this control signal provided by the TDD controller 314 to start and stop transmitting. In addition, the hybrid 306 can use the control signal provided by the TDD controller 314 to isolate the receive path of the PHY device 206a, which includes the RX buffer 318, the receiver 304, the ADC 312, and the PGA 310, from the shielded or coaxial cable coupled to the remote Ethernet transceiver when the PHY device 206a is transmitting. Similarly, the hybrid 306 can use the control signal provided by the TDD controller 314 to isolate the transmit path of the PHY device 206a, which includes the TX buffer 314, the transmitter 302, and the DAC 308, from the shielded or coaxial cable coupled to the remote Ethernet transceiver when the PHY device 206a is receiving.

Figure 4:
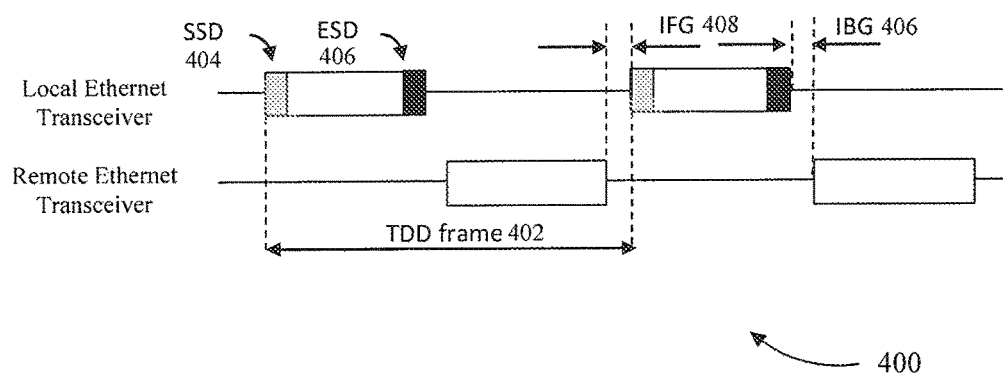
FIG. 4 illustrates a timing diagram that shows exemplary timing assignments for a local Ethernet transceiver and a remote Ethernet transceiver in accordance with embodiments of the present disclosure.

Referring now to FIG. 4, a timing diagram 400 that shows exemplary timing assignments for the local Ethernet transceiver, in which the PHY device 206a is implemented, and exemplary timing assignments for the remote Ethernet transceiver, to which the PHY device 206a is in communication, is illustrated in accordance with embodiments of the present disclosure. The timing Diagram 400 specifically illustrates two complete TDD frames, including TDD frame 402, during which each of the local and remote Ethernet transceivers have an opportunity to transmit and receive.

During the TDD frame 402, the local Ethernet transceiver is the first device to transmit over the communication link to the remote Ethernet transceiver. The local Ethernet transceiver's transmission can begin with a Start Stream Delimiter (SSD) 404, which contains a known sequence marking the start of the TDD frame 402. The local Ethernet transceiver can further end its transmission with End of Stream Delimiter (ESD) 406, which contains a known sequence marking the end of the local Ethernet transceiver's transmission.

After receiving the ESD 406 and after a predetermined Inter Burst Gap (IBG) 410 has elapsed, the remote Ethernet transceiver can begin its transmission. The remote Ethernet transceiver can continue transmitting until the end of the TDD frame 402 less the amount of time reserved for a predetermined Inter Frame Gap (IFG) 408. Although not necessary, the remote Ethernet transceiver's transmission can include SSD and ESD markings as well. In such a case, these markings inform the local Ethernet transceiver when the remote Ethernet transceiver has finished transmitting its data. The local Ethernet transceiver can take advantage of this information by beginning the next TDD frame early.

Figure 5:
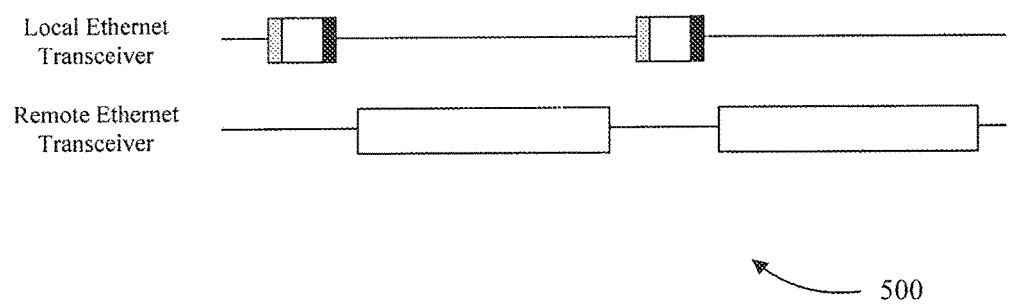
FIG. 5 illustrates another timing diagram that shows exemplary timing, assignments for a local Ethernet transceiver and a remote Ethernet transceiver in accordance with embodiments of the present disclosure.

In one embodiment, the local Ethernet transceiver can have control of the length of time the remote Ethernet transceiver can transmit, allowing for a variable or adaptive TDD frame length. In another embodiment, the TDD frame length can be predetermined or set during a link up period. The transmit time assignment for the local and remote Ethernet transceivers does not have to be equal or symmetrical. For example, for applications like automotive camera, data generated by the camera is typically much greater than the amount of data needed to control the camera. In this example, assuming the camera is attached to the remote Ethernet transceiver and the camera's controlling device is attached to the local Ethernet transceiver, the transmit times of the two Ethernet transceivers can be assigned such that the remote Ethernet transceiver has more transmit time than the local Ethernet transceiver during a TDD frame. The TDD approach allows such asymmetric time assignment as shown in the timing diagram 500 of FIG. 5. In yet another embodiment, when there is no data to be sent from either the local or remote Ethernet transceiver, the transmit time assigned to that device can be shortened to reduce power. In such a case, there are two options available: the first option is to keep the TDD frame length fixed, and the second option is to reduce the TDD frame length.

It should be noted that all of the transmit signal formatting features and functionality (e.g., the addition of SSD and ESD markings) discussed above in regard to FIGS. 4 and 5 can be implemented by the transmitter 302 of the PHY device 206a of the local Ethernet transceiver shown in FIG. 3.

It should be further noted that all timing features and functionality (e.g., control of the length of time each Ethernet transceiver is to transmit, which can be symmetric, asymmetric, and/or adaptive, and control of the length of the overall TDD frame) discussed above in regard to FIGS. 4 and 5 can be implemented by the TDD controller 314 in FIG. 3. For example, the TDD controller 314 can provide a control signal that can signal to the transmitter 302 when to start and stop transmitting a transmit signal over the shielded or coaxial cable and for how long (i.e., the duration in time) the transmitter 302 is to transmit the transmit signal over the shielded or coaxial cable. The TDD controller 314 can adapt such transmit duration based on a number of factors, including, current amounts of data being buffered by the TX buffer 316 or a control signal received from a high layer application.

3. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
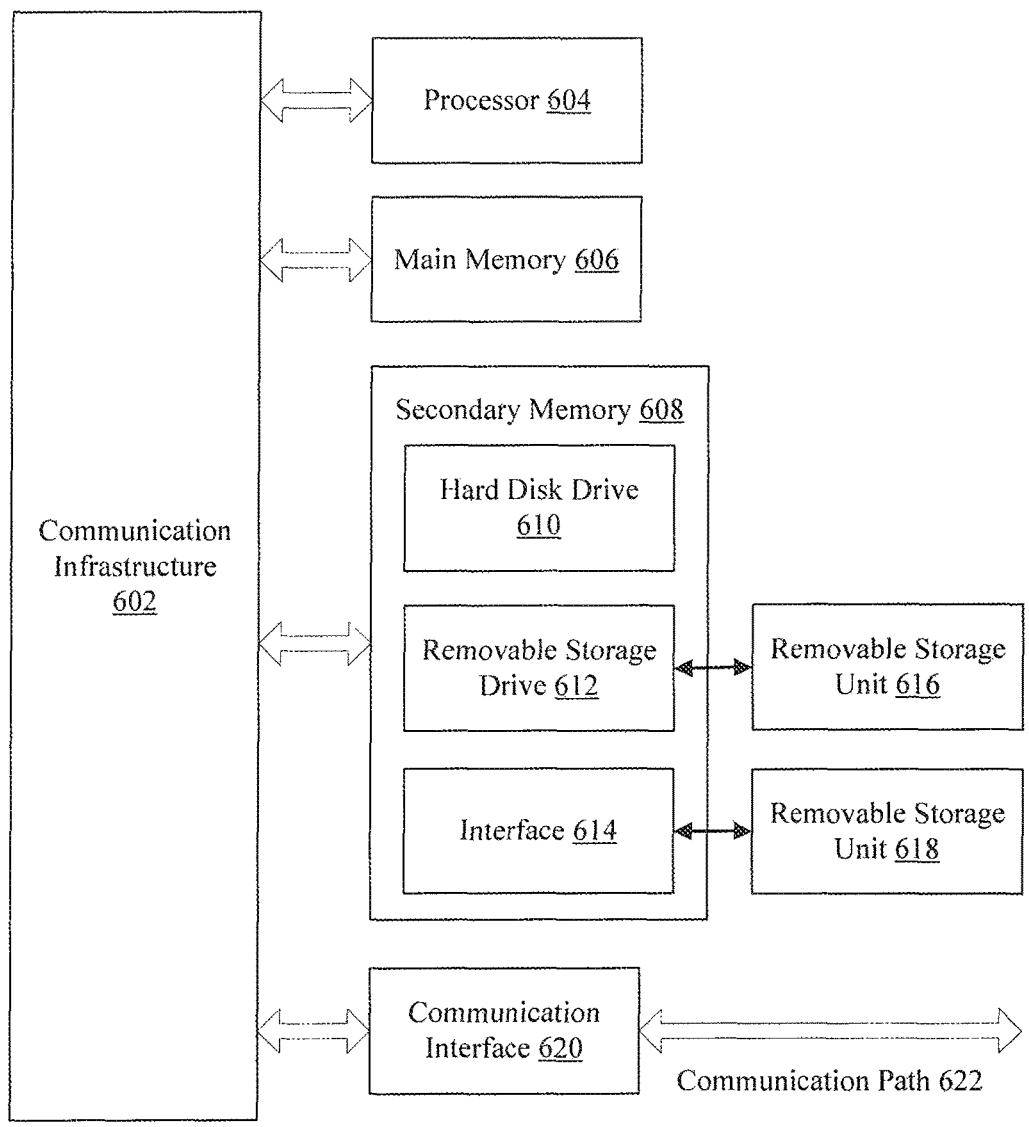
FIG. 6 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. Blocks depicted in FIGS. 2 and 3 may execute on one or more computer systems 600 to perform the functionality described herein.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

4. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An Ethernet transceiver within a first electronic domain of an in-vehicle network, comprising:
    a media access control (MAC) controller; and
    a physical layer (PHY) device comprising:
       a transmit buffer configured to buffer a plurality of frames of first media independent interface (MII) data received from the MAC controller over a first path and to cause the MAC controller to pause transmission of the plurality of frames of first MII data to the transmit buffer before being filled;
       a receive buffer configured to buffer a plurality of frames of second MII data for transmission to the MAC controller over a second path;
       a transmitter configured to convert a first frame from among the plurality of frames of first MII data buffered by the transmit buffer from a first-bit packet stream to a second-bit packet stream, the second-bit packet stream having fewer bits than the first-bit packet stream, to map the second-bit packet stream to a plurality of first bit streams, and to multiplex the plurality of first bit streams into a first single stream to form a transmit signal for transmission over a single pair of cables to a second Ethernet transceiver within a second electronic domain of the in-vehicle network during a first transmit time of a time-division duplex (TDD) frame;

a receiver configured to receive a receive signal received over the single pair of cables from the second Ethernet transceiver during a second transmit time of the TDD frame, to demultiplex the receive signal from a second single stream to a plurality of second bit streams, to map the plurality of second bit streams to a third-bit packet stream, and to convert the third-bit packet stream to a fourth-bit packet stream, the third-bit packet stream having fewer bits than the fourth-bit packet stream, to provide a second frame from among the second plurality of frames of MII data to the receive buffer for buffering; and a time-division duplex (TDD) controller configured to control when the transmitter starts transmitting the transmit signal during the first transmit time of the TDD frame over the single pair of cables to the second Ethernet transceiver and to adapt a duration of the first transmit time of the TDD frame in which the transmitter transmits the transmit signal over the single pair of cables to the second Ethernet transceiver.

2. The Ethernet transceiver of claim 1, wherein the TDD controller is configured to adapt the duration.

3. The Ethernet transceiver of claim 2, wherein the TDD controller is configured to adapt the duration based on an amount of the plurality of frames of first MII data buffered by the transmit buffer.

4. The Ethernet transceiver of claim 1, wherein the TDD controller is configured to adapt a length of time of the TDD frame.

5. The Ethernet transceiver of claim 1, wherein PHY device further comprises a hybrid configured to isolate the receiver from the single pair of cables based on the transmitter transmitting the transmit signal over the single pair of cables.

6. The Ethernet transceiver of claim 1, wherein the TDD controller is further configured to control the receiver to stop adaptation of an equalizer or cross-talk canceler implemented by the receiver based on the transmitter transmitting the transmit signal over the single pair of cables.

7. The Ethernet transceiver of claim 1, wherein the MAC controller is a 10 gigabit per second (Gbps) MAC controller compliant with the IEEE 802.3 standard.

8. The Ethernet transceiver of claim 1, wherein the single pair of cables are shielded or coaxial cables.

9. The Ethernet transceiver of claim 1, wherein the first transmit time of the TDD frame and the second transmit time of the TDD frame are separated in time by an Inter Burst Gap (IBG), and wherein the second transmit time of the TDD frame extends from the IBG to an end of the TDD frame less an amount of time reserved for an Inter Frame Gap (IFG).

10. The Ethernet transceiver of claim 1, wherein the first electronic domain and the second electronic domain are from among a plurality of electronic domains of an automobile, the plurality of electronic domains comprising:

a power train domain, a human-machine interface (HMI) domain, a body/comfort domain, a chassis domain, and a driver assistance domain.

11. The Ethernet transceiver of claim 1, wherein the transmit signal comprises:

a first sequence of bits marking a start of the TDD frame; and a second sequence of bits marking an end of the TDD frame.

12. An Ethernet transceiver in an in-vehicle network, comprising:

a media access control (MAC) controller; and a physical layer (PHY) device comprising:

a transmit buffer configured to buffer a plurality of frames of first media independent interface (MII) data received from the MAC controller over a first path and to cause the MAC controller to pause transmission of the plurality of frames of first MII data to the transmit buffer before being filled;

a receive buffer configured to buffer a plurality of frames of second MII data for transmission to the MAC controller over a second path;

a transmitter configured to convert a first frame from among the plurality of frames of first MII data buffered by the transmit buffer from a first-bit packet stream to a second-bit packet stream, the second-bit packet stream having fewer bits than the first-bit packet stream, to map the second-bit packet stream to a plurality of first bit streams, and to multiplex the plurality of first bit streams into a first single stream to form a transmit signal for transmission over a single pair of cables to a second Ethernet transceiver in the in-vehicle network during a first transmit time of a time-division duplex (TDD) frame;

a receiver configured to demultiplex a receive signal received over the single pair of cables from the second Ethernet transceiver during a second transmit time of the TDD frame from a second single stream to a plurality of second bit streams, to map the plurality of second bit streams to a third-bit packet stream, and to convert the third-bit packet stream to a fourth-bit packet stream, the third-bit packet stream having fewer bits than the fourth-bit packet stream, to provide a second frame from among the plurality of frames of second MII data to the receive buffer for buffering; and a time-division duplex (TDD) controller configured to adapt a duration of time the transmitter transmits the transmit signal during the first transmit time of the TDD frame over the single pair of cables to the second Ethernet transceiver.

13. The Ethernet transceiver of claim 12, wherein the TDD controller is configured to adapt the duration based on an amount of the plurality of frames of first MII data buffered by the transmit buffer.

14. The Ethernet transceiver of claim 13, wherein the TDD controller is configured to adapt a length of time of the TDD frame.

15. The Ethernet transceiver of claim 12, wherein the single pair of cables are shielded or coaxial cables.

16. The Ethernet transceiver of claim 12, wherein the first transmit time of the TDD frame and the second transmit time of the TDD frame are separated in time by an Inter Frame Gap (IFG).

17. A physical layer (PHY) device, comprising:

a transmit buffer configured to buffer a plurality of frames of first media independent interface (MII) data received from a media access control (MAC) controller over a first path and to cause the MAC controller to pause transmission of the plurality of frames of first MII data to the transmit buffer before being filled;

a receive buffer configured to buffer a plurality of frames of second MII data for transmission to the MAC controller over a second path;

a transmitter configured to convert a first frame from among the plurality of frames of first MII data buffered by the transmit buffer from a first-bit packet stream to a second-bit packet stream, the second-bit packet stream having fewer bits than the first-bit packet stream, to map the second-bit packet stream to a plurality of first bit streams, and to multiplex the plurality of first bit streams into a first single stream to form a transmit signal for transmission over a single pair of cables to a second Ethernet transceiver in an in-vehicle network during a first transmit time of a time-division duplex (TDD) frame;

a receiver configured to receive a receive signal received over the single pair of cables from the second Ethernet transceiver during a second transmit time of the TDD frame, to demultiplex the receive signal from a second single stream to a plurality of second bit streams, to map the plurality of second bit streams to a third-bit packet stream, and to convert the third-bit packet stream to a fourth-bit packet stream, the third-bit packet stream having fewer bits than the fourth-bit packet stream, to provide a second frame from among the second plurality of frames of MII data to the receive buffer for buffering; and a TDD controller configured to control when the transmitter starts transmitting the transmit signal during the first transmit time of the TDD frame over the single pair of cables to the second Ethernet transceiver and a duration of the first transmit time of the TDD frame in which the transmitter transmits the transmit signal over the single pair of cables to the second Ethernet transceiver.

18. The PHY device of claim 17, wherein the TDD controller is configured to adapt the duration.

19. The PHY device of claim 18, wherein the TDD controller is configured to adapt the duration based on an amount of the plurality of frames of first MII data buffered by the transmit buffer.

20. The PHY device of claim 17, wherein the TDD controller is configured to adapt a length of time of the TDD frame.

21. The PHY device of claim 17, further comprising:
a hybrid configured to isolate the receiver from the single pair of cables based on the transmitter transmitting the transmit signal over the single pair of cables.

22. The PHY device of claim 17, wherein the TDD controller is further configured to control the receiver to stop adaptation of an equalizer or cross-talk canceler implemented by the receiver based on the transmitter transmitting the transmit signal over the single pair of cables.

23. The PHY device of claim 17, wherein the MAC controller is a 10 gigabit per second (Gbps) MAC controller compliant with the IEEE 802.3 standard.

24. The PHY device of claim 17, wherein the single pair of cables are shielded or coaxial cables.

25. The PHY device of claim 17, wherein the first transmit time of the TDD frame and the second transmit time of the TDD frame are separated in time by an Inter Frame Gap (IFG).

* * * * *